March 17, 1959

W. C. SAEMAN 2,878,004

ROTARY FURNACE INSTALLATIONS AND METHOD OF PROCESSING CHARGES THEREIN

Filed June 21, 1955

INVENTOR.
Walter C. Saeman
BY
Attorney.

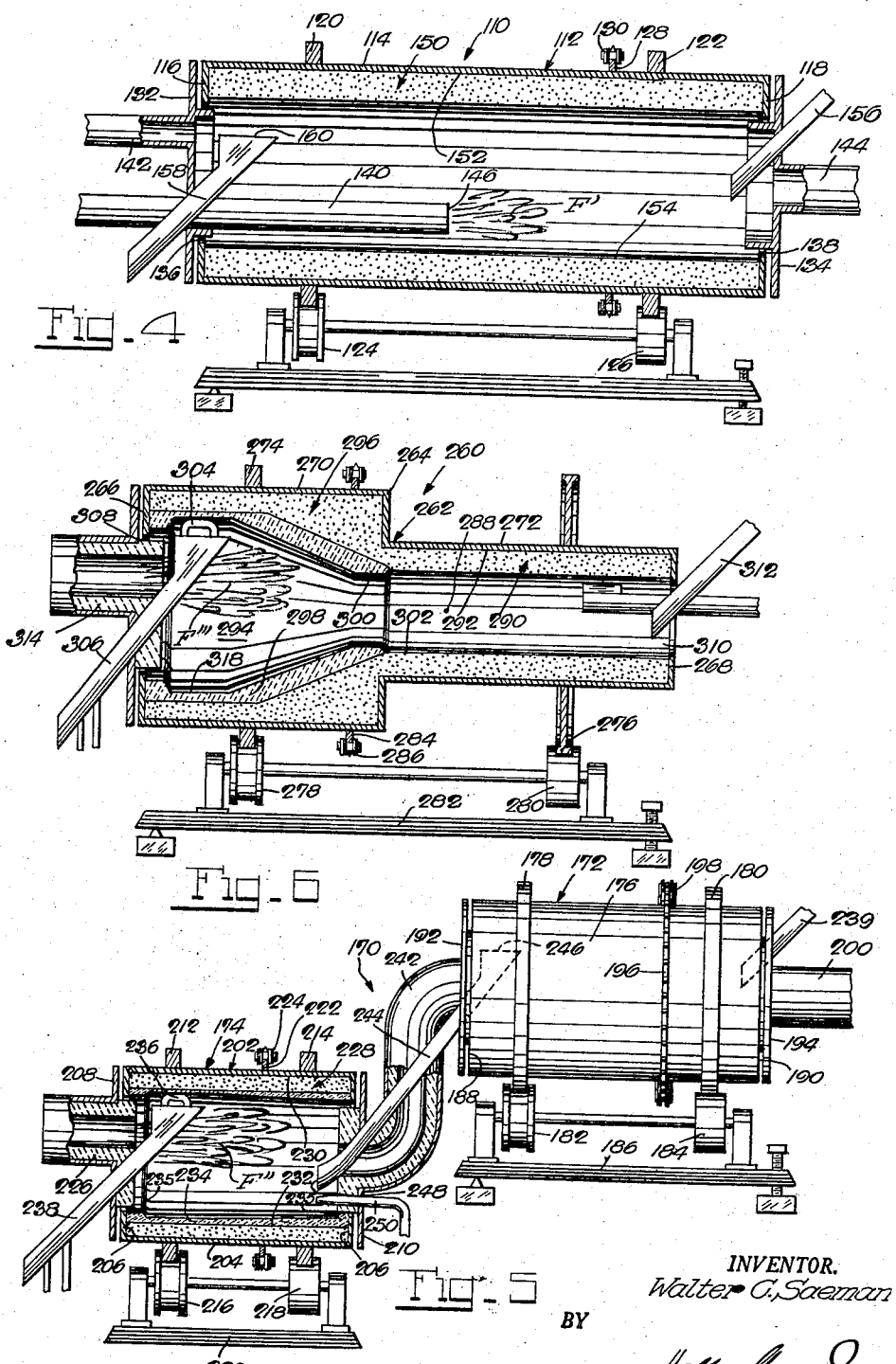

United States Patent Office 2,878,004
Patented Mar. 17, 1959

2,878,004
ROTARY FURNACE INSTALLATIONS AND METHOD OF PROCESSING CHARGES THEREIN

Walter C. Saeman, Orange, Conn.

Application June 21, 1955, Serial No. 516,922

14 Claims. (Cl. 263—32)

This invention relates generally to furnace-type thermal operations, and more particularly to high heat-intensity thermal processes and refractory-lined furnaces therefor.

The present invention is directed especially, though not exclusively, to thermal fusion of granular or lumpy solids or heat treatment of solids and gases in furnace operation involving high temperatures. More particularly, the present invention is directed to the aforementioned thermal processing of matter of which previous attempts at achievement raised serious problems in preventing early breakdown or destruction of the furnaces involved due to their chemical reaction with the matter being processed therein or their subjection to heat of extremely high heat intensity therein, or both. While some thermal furnace operations of this type are known and in use, these are rather limited in scope due to many operational and maintenance difficulties stemming from inadequate furnace linings which themselves are subject to early breakdown or degradation and fail adequately to protect the furnace shell, usually steel, from early destruction. Insofar as the devastating effects of heat of very high intensity upon these linings is concerned, some measure of protection therefrom may be obtained by artificially cooling the same, but this entails not only a considerable increase in the cost of the furnace installation, operation, and maintenance and prohibitive heat losses, but also incurs other serious objections. Moreover, quite a few thermal processes are known which are technically feasible and economically attractive, but which to this day cannot be pursued on a commercial basis for lack of a known furnace lining that will stand up even for a limited length of time under the conditions imposed upon it by these processes.

Previous furnaces for processing solids and gases at high temperatures are customarily built as stationary installations having permanent non-reactive refractory linings and being heated electrically or by a flame or flames. To this end, the linings are customarily in the form of massive bonded refractories which are especially subject to degradation due to the considerable thermal stresses induced in them by heating and cooling, and it is for this reason that a refractory furnace lining, if at all available, must be chosen very carefully for any particular thermal process. In this connection, it is significant that massive bonded refractory linings frequently require artificial cooling so as not to degrade within an unreasonably short period of time. Also, the thickness of the refractory lining in stationary furnaces is often limited by its close proximity to auxiliary cooling facilities required to maintain sufficient rigidity to prevent its partial fusion and run-off by gravity. It thus follows from the preceding that chemical reactivity of the permanent refractory furnace linings with the process material and degradation of the former due to thermally induced stresses therein are among the more vexing problems of major magnitude in the use of stationary furnaces for the thermal processes under consideration.

To give an indication of the difficulties that may be encountered in furnace operations of this type, reference is made, by way of example, to previous efforts to pursue commercially the well known and highly advantageous and economical process of defluorinating natural phosphates by thermal fusion to produce low-cost phosphatic fertilizers. The results of these efforts by T. P. Hignett and T. N. Hubbuch are described, in Industrial and Engineering Chemistry, 1938, pages 1208 to 1216, in part as follows:

"The burner ports were originally lined with mullite refractory to an inside diameter of 21 inches; however, this refractory was melted away from the upper part of the burner ports within a few hours after operation was started and was replaced by a layer of solidified fused phosphate about one-half inch thick that formed on the water-cooled shell of the burner ports. The water-cooling was inadequate to protect the steel shell, and the steel shell failed frequently as a result of burnouts, and warping and splitting of welds."

While Hignett and Hubbuch subsequently provided additional protection to the refractory linings of the burner ports and hearth walls by embedding cooling conduits and cooling plates within the refractories themselves, and thereby extended the furnace life as well as improved its operating performance, the seeming success of their additional efforts to prolong the furnace life by intensive artificial cooling of their refractory linings is greatly impaired by the inevitable increase in the cost of installation, operation and maintenance of the furnace. This seeming success is also gained at the cost of increased heat losses from the material being processed, since stationary furnace walls retain at most a relatively thin layer of viscous or solid melt as insulation between the molten material and the protected water-cooled liner surfaces.

While conventional rotary kilns are extensively used for high-temperature treatment of granular and ground materials, continuous fusion operations are handicapped by partial solidification of the hot melt on the nose rings of the kilns which interferes with the rotation of the latter. Furthermore, the problem of providing a non-reactive refractory lining for a rotating kiln is even more difficult than in the case of stationary furnaces, since neither the shell of the kiln nor the refractory lining therein readily lend themselves to artificial cooling. Hence, the thermal processing of ground or granular materials in rotary kilns is customarily limited to incipient fusion of the materials to produce clinkers, nodules or agglomerates.

It is the primary aim and object of the present invention to device a method of thermally fusing granular or lumpy solids, or heat-treating solids or gases, in a furnace operation in pursuance of any and all known furnace-type thermal processes, including those which are as yet commercially unattainable, without encountering any of the aforementioned serious difficulties and limitations in previous furnace operations of this type.

It is another object of the present invention to devise a method which not only achieves the aforementioned highly advantageous objectives insofar as the broad scope of its applicability to all known and even future processes of this general type is concerned, but which also permits the commercial pursuance or exploitation of these processes at much lower initial, operating and maintenance cost of a processing furnace therefor than was possible with furnaces used heretofore for this purpose.

It is a further object of the present invention to devise a method of thermally processing granular solids or gases in a furnace operation according to which the furnace, which is of the rotary type, receives for a lining non-bonded granular refractory material, and is driven at a speed at which centrifugal force will, after initial rough distribution of the granular material over the entire peripheral wall of the furnace, compel this material to distribute itself even further over the inner wall of the rotating furnace shell so as to form thereon a liner of uniform thickness throughout, within which the process takes place. In following this method, an assuredly protective furnace lining may be chosen from a wide variety of readily available granular materials whose only requirement is adequate thermal stability for any and all contemplated thermal processes, including those of the most severe refractory duty or involving the most extreme heat conditions yet encountered or known. In this connection, the wide variety of readily available granular materials from which a furnace lining may be chosen is not restricted by any considerations of thermal stresses or bonding materials as heretofore, because thermal stresses induced in the present non-bonded granular furnace lining by heating and cooling the same have at the most a negligible degrading effect on the lining. Furthermore, this method achieves a significant reduction in heat losses from the charge being processed in comparison to those heat losses unavoidably sustained in prior furnaces with permanent bonded refractory linings, not only by virtue of the fact that non-bonded granular material such as used here has inherently a lower heat transfer coefficient than the same material in bonded massive refractory form, but also because the present non-bonded furnace lining may, on mere selection of the centrifugal force imparted to it, be held at any desired thickness, and in any event at greater thickness than was possible heretofore, especially where artificial cooling of the prior bonded refractory furnace linings had to be resorted to in order to avoid, or at least delay, degradation thereof. Also, a furnace lining established and maintained according to this method is self-repairing in case of indentation anywhere, as on dislodgment therefrom of any particular solid matter not wanted therein, for the centrifugal force constantly acts on the lining to distribute the granules thereof most evenly throughout and will bring about immediate refilling of the indentation. Moreover, to prevent possible contamination of any particular processed fusion product by the furnace lining, it is always possible to use for the lining material the same kind as that being processed, though any other existing non-reacting granular material may be used in lieu thereof for the furnace lining, whichever is more advantageous.

Another object of the present invention is to devise a method of thermally fusing granular or lumpy solids in a furnace operation according to which the aforementioned non-bonded granular lining material in the furnace shell will on normal drive of the latter build up into a static layer of uniform thickness within the entire radial region thereof in which centrifugal force exceeds gravitational force, so that granular solids to be processed and subsequently deposited in the lined furnace will repeatedly be carried to the top of the furnace and from there gravitate in cascading fashion to the bottom thereof substantially throughout the cross-sectional furnace area for optimum possible heat-exchange between the hot processing gases and the process material. In thermally fusing granular solids according to this method, there will not only be achieved most economical operation of the furnace and also optimum and most rapid heat transfer from the gases to the material and, hence, a complete process cycle of minimum duration, but there will also be obtained a most uniform end product and the use of a furnace will be permitted which for a given performance may be exceptionally small in size and accordingly low in cost insofar as its initial purchase, operation and maintenance are concerned.

It is another object of the present invention to devise a method of thermally fusing granular or lumpy solids in a continuous furnace operation according to which granular process material is fed continuously and at a controlled rate into the aforementioned lined furnace in operation through one end thereof, and the furnace is slightly inclined to the horizontal so that the process material therein will repeatedly cascade not only throughout the cross-sectional furnace area but also progressively toward the other or discharge end of the furnace and toward and through a fusion zone of greatest heat intensity to become thoroughly preheated on its approach to this zone and readily molten when reaching the latter, thereby to achieve an exceptionally high production capacity of the furnace for its given size and production of the desired end product at exceptionally low cost.

It is a further object of the present invention to devise a method of thermally fusing granular or lumpy solids in a continuous furnace operation as aforementioned, according to which a burner or other heat source in the furnace is, furthermore, so arranged in the aforementioned fusion zone that the heat therefrom melts processing material therein in a central portion of this zone so that, on an initial start of the furnace with a fresh non-bonded granular lining, solidified and semi-fused process matter will quickly accumulate in annular ridge formations in the cooler end portions of this zone next to the discharge end of the furnace and intermediate the length of the latter, respectively, while the continuously accumulating molten material in the hot central portion of the fusion zone, forming in part a puddle at the bottom thereof, and due to surface tension in part clinging to and traveling with the spinning furnace lining, will permit solidification of a relatively thin bottom layer of this fused matter and form, together with the solidified and semi-fused ridge formations, an internally concave bowl-like fusion chamber which, for this and other furnace operations in which the present lining is retained, remains stable and prevents the constantly accumulating molten mass therein from spilling over the discharge end of the furnace and, instead, holds it for orderly and safely controlled removal in scoop fashion therefrom, thereby not only providing for the least hazardous removal of the molten charge from the furnace, but also confining all solidified, fused and semi-fused matters within the furnace and prevent their spilling from the furnace and possible interference with the rotation of the latter.

Another object of the present invention is to achieve in the aforementioned method of thermally fusing granular or lumpy solids in a continuous furnace operation the removal of the molten material in scoop fashion from the aforementioned concave fusion chamber by holding a scoop-like extension of a discharge funnel or trough in the path of molten material clinging to and traveling with the spinning wall of the fusion chamber, thereby not only to achieve continuous and most efficient removal of the molten charge from the furnace, but also gain ready control over the continued retention of the desired concavity of the fusion chamber throughout, except at its inner semi-fused ridge formation which is cumulative and requires occasional removal of excess material by means of relatively short bars that may be passed into the furnace through the relatively cool feed-in end thereof and require only slight artificial cooling, if any.

A further object of the present invention is to make provisions in the aforementioned method of thermally fusing granular or lumpy solids in a continuous furnace operation, in the event that processing granular materials have sharply defined melting points and form melts of such high mobility as to cling to the spinning wall of the fusion chamber in a layer of insufficient thickness to permit removal of the molten charge in the aforementioned scoop fashion at the rate it is being produced, for increasing the consistency of the melt to the point where the layer thereof clinging to and traveling with the spinning wall of the fusion chamber is of sufficient thickness to permit scoop removal of the molten charge at the rate it is being produced, by lowering the temperature at the chamber wall portion leading to the scoop region thereof by means of an air jet or jets thereagainst in order to cause an increase in the viscosity of the molten material thereat, or, alternatively, by employing an air jet or jets to accelerate the flow of molten material on the wall of the fusion chamber in the direction of its rotation, or, further alternatively, by feeding a regulated amount of cool granulated process material directly into the fusion chamber to mix with the melt therein and thereby increase its consistency to the required extent.

It is another object of the present invention to devise a method of thermally fusing granular or lumpy solids in a continuous furnace operation according to which the solids are processed successively in two independently operated furnaces for their preheating and fusion, respectively, with the cascading preheated granular material in the preheat furnace being through an appropriate chute discharged by gravity directly into a previously molten charge in the fusion furnace, so as to be directly fused therein, thereby not only obviating any formation of semi-fused material anywhere in the fusion chamber of the fusion furnace and periodic removal therein of obstructing semi-fused formations by bore bars or otherwise, but also permitting, in the absence of any requirement of cascade of the granular solids in the fusion furnace, such high rotary speed of the latter as uniformly to distribute the entire melt over the entire inner wall thereof for most expeditious removal yet of the molten charge in the aforementioned scoop fashion. Optimum production capacity is also achieved with the instant dual furnace operation since it permits operation of each furnace at maximum efficiency and independently of the other furnace.

It is a further object of the present invention to achieve maximum economy and efficiency in the aforementioned dual furnace operation by conducting the hot gases from the fusion furnace through a duct into the pre-heat furnace to flow therein counter to the cascading granular process material for optimum heat exchange between them.

Another object of the present invention is to devise a method of thermally treating gases according to which a localized high-temperature zone is maintained intermediate the length of a rotary furnace of the aforementioned lined type, with the gas or gases to be processed introduced at one end of the furnace and drawn off at the other end thereof and with granular material continuously cascading throughout the cross-sectional furnace area and also throughout the length of the furnace counter to the flow of the gases therein, whereby the cool granules are heated on their way toward the high-temperature zone through heat-exchange with the counter-flowing hot gases from this zone and the cool gas or gases are preheated on their way to the high-temperature zone through heat-exchange with the hot granules on their continued cascade away from this zone, thereby to achieve most expeditious heating of the processing gas or gases to the required temperature in a furnace of minimum size and with the utmost economy. Also, by varying the relative heat-transfer capacities of the cascading granules and the gases within the rotary furnace, a variety of gas temperature curves may be established and maintained within the furnace to promote optimum conversion efficiency for the particular gaseous products desired.

A further object of the present invention is to provide furnace and other equipment of simple construction yet efficient and reliable operation with which to carry out the contemplated thermal processes in accordance with the aforementioned methods.

It is also among the objects to adapt the aforementioned methods and equipment specifically, but by no means exclusively, to carrying out such thermal processes as low-cost defluorination of natural phosphates by fusion to produce phosphatic fertilizers, low-cost decomposition of calcium sulfate in its natural or antificial forms to yield sulfur dioxide for the manufacture of sulfuric acid, low-cost direct fixation of nitrogen at high temperature, and low-cost thermal regenerative treatment of the various petroleum gases to produce ethylene, acetylene and the like.

Other objects and advantages will appear to those skilled in the art from the following, considered in conjunction with the accompanying drawings.

In the accompanying drawing, in which certain modes of carrying out the present invention are shown for illustrative purposes:

Fig. 1 is a longitudinal section through a rotary furnace embodying the present invention;

Figs. 2 and 3 are cross sections through the furnace, taken on the lines 2—2 and 3—3, respectively, of Fig. 1;

Fig. 4 is a longitudinal section through a rotary furnace for pursuing a thermal process other than that pursued in the furnace of Fig. 1;

Fig. 5 is a side-elevational view, partly in section, of a rotary furnace installation embodying the present invention in another modified manner; and Fig. 6 is a longitudinal section through a rotary furnace embodying the present invention in a further modified manner.

Figure 1:
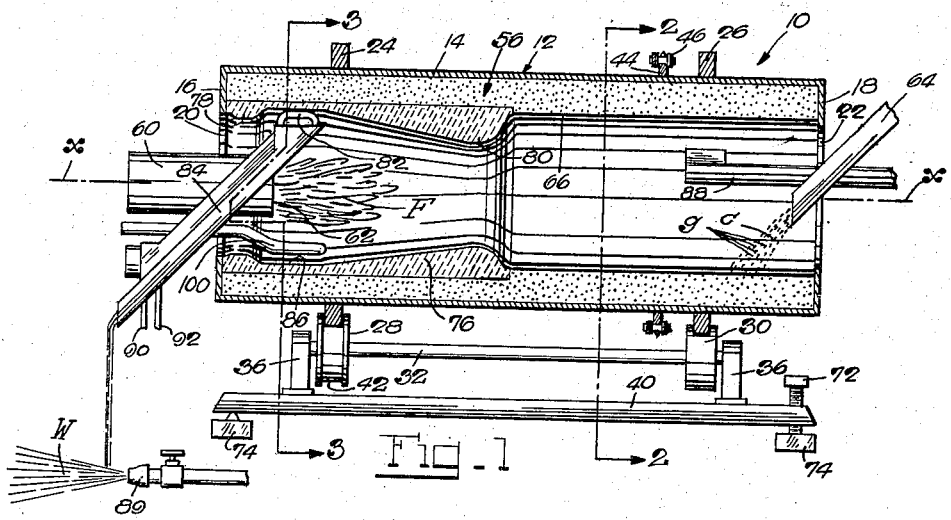
Figure 3:
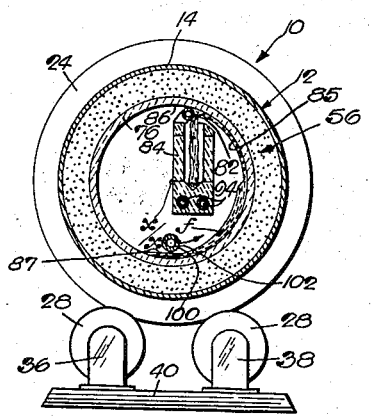
Fig. 3A is a longitudinal section through a heated funnel through which to discharge the molten material from a furnace such as shown in Fig. 1.
Fig. 3B is a fragmentary section through part of a rotary furnace embodying the present invention in a modified manner.
Figure 2:
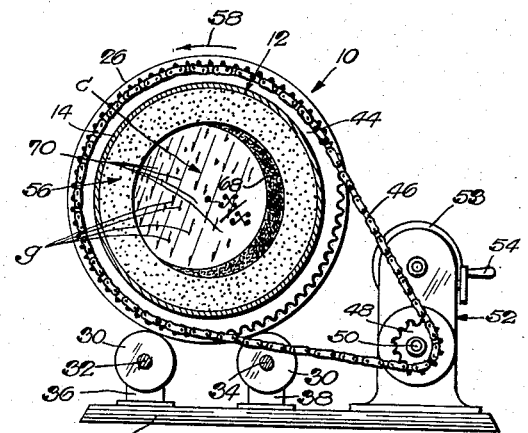

Referring to the drawings, and more particularly to Figs. 1 to 3 thereof, the reference numeral 10 designates a rotary furnace which comprises a rigid furnace shell 12 having a peripheral wall 14 and in this instance also integral inwardly extending end flanges 16 and 18 which leave the ends of the furnace shell open as at 20 and 22. In the present instance, the furnace shell 12 is disposed with its longitudinal axis $x$—$x$ substantially horizontally. In this instance also, the peripheral wall 14 of the furnace shell 12 is cylindrical and the latter is mounted for rotation about its longitudinal axis $x$—$x$. To this end, the peripheral wall 14 of the furnace shell 12 is provided with a plurality, in this instance two, axially spaced ring-shaped races 24 and 26 which, in the present example, ride on pairs of rotary rollers 28 and 30, respectively. The rollers 28 and 30 on opposite sides of the axis $x$—$x$ of the furnace shell 12 are mounted on shafts 32 and 34 which are journalled in suitable bearing brackets 36 and 38, respectively, on a base 40. The rollers 28 and 30 on the opposite sides of the axis $x$—$x$ of the furnace shell are spaced apart sufficiently to hold the latter in stable equilibrium when the same is at rest or driven (Figs. 2 and 3). In order to hold the furnace shell 12 against endwise motion, the race 24 thereon may conveniently ride in peripheral grooves 42 in the rollers 28 (Fig. 1).

Provisions are made to drive the furnace shell 12. To this end, the same is provided intermediate its length with a sprocket 44 which through a chain 46 is drivingly connected with a sprocket 48 on the output shaft 50 of any suitable variable speed mechanism 52 the input shaft of which may be driven from any suitable prime mover, such as an electric motor 53. The mechanism 52 has a handle 54 which may be manipulated to vary the speed of the output shaft 50 within a certain range.

In accordance with the present invention, the furnace shell 12 is provided with a refractory lining 56 of loose unbonded granular thermal insulation of any suitable kind which will neither melt on subjection to the heat prevailing in the furnace in the pursuance of a thermal process therein, nor chemically react with the charge to be processed therein. The unbonded granular insulation is initially dumped into the bottom of the furnace shell 12, preferably throughout its length, and is retained therein by the opposite end flanges 16 and 18. On starting the furnace shell 12 into rotation, in the direction of the arrow 58 in Fig. 2, for instance, the dumped granular insulation becomes dispersed over the entire peripheral wall 14 and is retained thereon by centrifugal force as the furnace shell is accelerated. Having once achieved the formation of the lining 56, the furnace is ready for operation in pursuance of a desired thermal process, the furnace shell 12 being all the while driven at sufficient speed centrifugally to sustain the lining 56 on the inner peripheral shell wall 14 with the end flanges 16 and 18 acting to confine the lining against endwise escape from the furnace shell.

The furnace of Fig. 1 is shown, by way of example, in operation pursuant to a thermal fusion process according to which a charge $c$ of granular solids $g$ is fused therein on being subjected to appropriate heat and the fused charge $f$ is removed from the furnace for further processing. To this end, the requisite heat in the furnace is furnished by a flame F from a fixed burner 60 which is suitably fed with fuel and combustion air to sustain the flame F therefrom. Preferably, the burner 60 projects with its flame end 62 through the opening 20 into one end of the furnace, while the granular charge $c$ is introduced into the furnace through the opening 22 into the other end thereof, with the granules $g$ of the introduced charge repeatedly cascading toward the flame F. The granular charge $c$ is, in the present instance, fed into the furnace through a chute 64 which extends through the furnace opening 22 and is downwardly inclined for the gravity discharge of the granules $g$.

To achieve cascading of the introduced granular charge $c$ in the spinning furnace, the latter is with its rotary axis $x$—$x$ disposed at an inclination to the horizontal with its end at the opening 20 being lowermost, and the lined furnace shell 12 is spun at a speed at which the centrifugal force of its inner lining surface 66 is substantially equal to its gravitational force. Thus, by spinning the furnace shell at the speed just indicated, the lining 56 will safely be sustained, but the gravitational force of the granular charge $c$ therein will be somewhat larger than its centrifugal force, with the result that the charge will be lumped on and carried by the spinning lining substantially to the top thereof as indicated at 68 in Fig. 2, whereupon its gravitational force will exert itself and compel the same to cascade substantially throughout the cross-sectional area of the lining transversely thereof to the bottom as indicated at 70 in Fig. 2, only to be picked up again by the spinning lining and carried to the top for repeated cascading. Further, by inclining the furnace as described, the cascading granular charge $c$ will also have a forward component motion longitudinally of the furnace progressively toward the flame F. The forward progress of the cascading granular charge $c$ in the furnace depends, of course, on the selected inclination of the furnace. In order to regulate the forward progress of the granular charge so as to adapt the instant furnace for most efficient fusion of granular solids of different melting points, the inclination of the base 40, and hence of the furnace, is preferably adjustable, as by set screws 72 which bear against a fixed support 74, for instance.

As shown in Fig. 1, the flame F near one end of the furnace is generally directed toward the other end thereof so as to establish and maintain therein a heat zone of gradually diminishing temperatures extending from adjacent the flame to the opening 22 in the furnace, as well as induce therein the flow of the combustion products and air toward the furnace opening 22. By virtue of their repeated cascading transversely of the furnace as well as longitudinally thereof progressively toward the flame F, the granules of $g$ of the introduced charge $c$ are not only brought into maximum heat-exchange relation with the hot combustion products and air in the aforementioned heat zone in the furnace, but they also progress, counter to the flow of the hot combustion products and air, through furnace regions of increasing heat intensity, with the result that the granules $g$ become during their relatively short longitudinal travel in the furnace thoroughly preheated and will readily melt or fuse when reaching the furnace region of maximum heat intensity.

In starting the furnace into operation, the flame F will be ignited and the heat therefrom permitted to melt an inner layer of the spinning lining 56 before a granular charge is fed into the furnace. The initially molten layer of the lining material will be formed in the immediate vinicity of the flame F and will in part seep toward the adjacent end of the furnace where it will encounter lower temperatures and, hence, become solidified. Solidification of the molten layer in the vicinity of the flame will also take place from the bottom thereof, though at a slower rate, with the result that an impervious open-ended solid bowl 76 will begin to form on the spinning granular lining 56 over a part of its length, this bowl being of substantially uniform wall-thickness circumferentially by virtue of the fact that the molten material, due to its surface tension, will form on the lining an adhering layer which rotates therewith and solidifies thereon. The impervious bowl 76 will also initially be formed into concave shape by reason of the fact that solidification of the fused material takes place more rapidly at a distance from the flame F than in the immediate vicinity thereof, resulting in the outer and inner end constrictions 78 and 80 on the bowl. As the bowl 76 is thus built up, the granular charge $c$ may be fed into the furnace, soon to reach and melt in the bowl 76 after first cascading in the described manner through the aforementioned heat zone in the furnace.

The molten charge $f$ is removed from the impervious bowl 76 by the inlet end 82 of a funnel 84 of which the former is in scooping relation with a layer 85 of the fused charge which clings to and turns with the bowl 76, while the funnel 84 extends through the furnace opening 20 to the outside thereof for the discharge of the scooped-up molten charge thereat. As shown in Figs. 1 and 3, the inlet end 82 of the funnel is arranged near the top of the inner bowl wall 86 so as to scoop up the fused layer 85 which actually clings thereto and travels therewith, rather than that part of the molten charge which forms a shallow puddle 87 at the bottom of the bowl. The funnel 84 is mounted in any suitable manner so that its inlet end 82 is adjustable substantially radially of the bowl 76, thereby not only to permit the arrangement of the funnel in optimum scooping relation with the fused layer 85 on the bowl wall 86, but also afford a convenient control over the wall-thickness of the bowl 76 and retention of its concavity to prevent escape or spilling of the fused charge therefrom.

The outer end constriction 78 on the impervious bowl 76 being once formed in the aforementioned manner, will remain intact and require no further attention, for it consists primarily of solidified matter to which no additional matter is added unless the molten charge in the bowl should be permitted to overrun the latter accidentally. However, the inner end constriction 80 on the bowl 76 is in part formed by steadily accumulating semi-fused matter which requires periodic removal of all excess beyond a given opening thereat so as to prevent clogging of the bowl. To this end, a bore bar 88, suitably supported in outside guides (not shown), is periodically advanced into the furnace, through the relatively cool rear end thereof, in order to remove the excessive accumulation of semi-fused matter at the inner end constriction 80 of the bowl 56 and drop it into the latter for fusion therein.

While in the hereinbefore described exemplary start of a fusion operation of the instant furnace the bowl 76 is formed in toto, or at least in part, by a fused layer of the lining material itself, this bowl may also be formed in the same manner by an initially molten part of the granular charge to be processed if the lining material in the furnace shell is of a kind which will not melt even in the immediate vicinity of the flame F.

The fused charge or melt being discharged from the funnel 84 may be disposed of for further processing in conventional ways. Thus, the discharged melt may be directed into a jet of water W from a valve-controlled nozzle 89 to form granulated slag or the like.

Figure 3B:
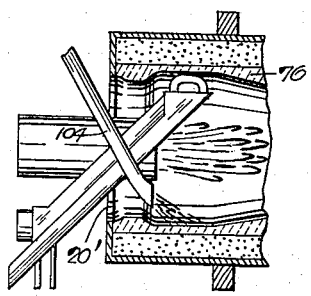
Figure 3A:
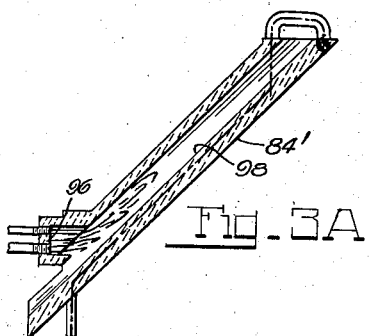

The funnel 84 has a relatively small surface area which is subjected to the more or less hot melt, and the former may adequately be protected, if necessary, by appropriate water-cooling without incurring excessive heat losses in the melt, as by circulating water through conduits 90 and 92 and a passage 94 in the funnel (Figs. 1 and 3). In some cases, the heat of the melt may not even be sufficient to maintain a fluid passage throughout the funnel, in which case recourse may be had to an auxiliary burner 96 (Fig. 3A) to heat the funnel 84' internally to a temperature at which to maintain the fluid passage 98 intact.

The amount of molten material adhering to the spinning bowl wall 86 is variable and depends on the temperature, melting point range and viscosity of the molten charge. Thus, some granular solids have a sharp melting point, resulting in high mobility of the melt and, hence, only slight adherence of the same to the spinning bowl wall for its scoop-up by the funnel at a lower rate than that at which the continuously fed granular charge melts in the bowl. To remedy this situation, the temperature of the fused layer 85 to be scooped from the spinning bowl wall 86 may be dropped to near its freezing point in order to increase its viscosity and achieve its discharge or drainage from the furnace at substantially the same rate at which the granular charge melts. This may conveniently and efficiently be accomplished by extending into the bowl 76 through the open end 20 of the furnace a conduit 100 having lateral openings 102 through which to direct jets of cool air against the fused layer 85 on the bowl wall (see particularly Fig. 3). These air jets may also be directed generally in the spinning direction of the bowl 76, as shown in Fig. 3, so that they may also serve to accelerate the flow of fused material along the bowl wall toward the inlet end of the funnel for its scoop-up by the latter at an increased rate. An alternative method of achieving an adequate drainage rate of the melt from the furnace is to introduce cool granulated solids of the same charge material directly into the bowl 76 (Fig. 3B) in order to mix with the melt therein, and on becoming fused lower the over-all temperature of the melt and accordingly increase its viscosity. The cool granular solids may thus be introduced into the bowl 76 through a chute 104 which extends through the open end 20' of the furnace.

It follows from the preceding that the instant furnace 10 is ideally suited for a continuous fusion process according to which the granular charge is continuously fed into the lined furnace through one end thereof, therein repeatedly to cascade transversely as well as longitudinally thereof in intimate heat-exchange relation with the counter-flowing combustion products and hot gases in order to become thoroughly preheated and finally fused when reaching the bowl 76. The fused charge in the bowl 76 is continuously drained therefrom, preferably in the aforementioned scoop-up fashion, while recourse may be had to any of the aforementioned remedies to increase the viscosity of the melt, if necessary, in order to achieve an adequate drainage rate.

Reference is now had to Fig. 4 which shows a furnace 110 of the present invention that is adapted for thermally processing a gas or gases, hereinafter referred to collectively as "gas." The instant furnace 110 is in many respects like the hereinbefore described furnace 10, except that the former is devoid of a fusion bowl and a melt discharge funnel and, furthermore, need not be inclined to the horizontal. Thus, the instant furnace 110 comprises a cylindrical furnace shell 112 having a peripheral wall 114 and opposite inwardly extending end flanges 116 and 118. The furnace shell 112 has axially spaced outer races 120 and 122 which ride on rollers 124 and 126, respectively, for the support of the furnace for rotation about its longitudinal axis. Suitable means, including a sprocket 128 on the furnace shell 112 and a chain 130, are provided for driving the furnace at variable speed. Provided on the opposite ends of the furnace shell 112 are fixed cover plates 132 and 134 which substantially close the end openings 136 and 138, respectively, in the shell. Projecting through the cover plate 132 into the interior of the furnace is a suitable burner 140 the flame F' from which serves to heat the interior of the furnace to the temperature required for the intended thermal process. The flame F' may be sustained by fuel and air conducted to the burner 140. The gas to be processed may be introduced into the furnace through a conduit 142 at the cover plate 132, while the processed gas may be drawn from the furnace through an exhaust conduit 144 at the other cover plate 134. In any event, the exhaust conduit 144, with or without an exhaust fan, is arranged to induce the flow of the introduced gas through the furnace. The burner 140 need not necessarily point with its flame end 146 toward the exhaust end of the furnace, but may be arranged in the furnace to point in any desired direction therein.

The lining 150 in the present furnace is, as in the previously described furnace 10, formed of loose unbonded granular thermal insulation of any suitable kind which, however, will not melt at the prevailing temperature in the furnace. The lining 150 is sustained on the inner peripheral shell wall 152 by centrifugal force. Since the exemplary thermal gas process performed in the instant furnace 110 does not involve any cascading granular charge, the furnace shell 112 may well be spun at a rate at which the centrifugal force of the inner lining surface 154 exceeds its gravitational force.

The instant furnace 110 may also be adapted for thermally processing gas by a different method according to which cascading granular solids in the furnace serve as a very effective heat transfer agent between the combustion products and the gas to be processed. In this case, the furnace shell 112 is with its rotary axis inclined to the horizontal with the gas admission end thereof lowermost. The granular heat-transfer solids are continuously circulated through the furnace, being to this end introduced thereinto through a chute 156 in the cover plate 134 and discharged through another chute 158 in the other cover plate 132 only to be returned to the chute 156 for recirculation through the furnace. By driving the furnace shell 112 in this instance at a speed at which the centrifugal force of the inner lining surface 154 is substantially equal to its gravitational force, the granular solids, which are chosen so as not to melt at the prevailing temperature in the furnace, will cascade therein not only transversely thereof but also longitudinally thereof toward and past the flame F' counter to the flow of the combustion products and the gas to be processed toward the exhaust end of the furnace. The cascading granular solids, which are thus in most intimate heat-exchange relation with the counter-flowing combustion products and absorb a maximum possible amount of heat by the time they reach the vicinity of the flame F', give up most of their heat to the counter-flowing gas to be processed as they cascade past and beyond the flame F', thereby preheating the relatively cool gas most effectively on its travel toward the furnace region of greatest heat intensity in the vicinity of the flame and assuring completion of the thermal process during the relatively short travel of the gas through the remainder of the furnace. The inlet 160 of the discharge chute 158 is so disposed and of such cross-sectional area as to receive the granular solids cascading thereagainst, so as to avoid gradual filling of the furnace with these solids.

Reference is now had to Fig. 5 which shows an alternative furnace installation 170 for preheating and fusing granular materials. This installation comprises dual furnaces 172 and 174 which may aptly be termed "preheat" and "fusion" furnaces, respectively. The preheat furnace 172 comprises a cylindrical furnace shell 176 having races 178 and 180 which ride on pairs of rotary rollers 182 and 184, respectively, on a base 186 for the support of the furnace shell for rotation about its longitudinal axis which, for a reason explained hereinafter, is inclined to the horizontal with the end 188 of the furnace lowermost. The open ends 188 and 190 of the furnace shell 176 are closed by fixed cover plates 192 and 194, respectively. Suitable means, including a sprocket 196 on the furnace shell and a chain 198, are provided for driving the furnace shell at variable speed. The cover plate 194 is provided with an exhaust conduit 200 through which to draw combustion products and other gaseous matter from the preheat furnace 172 and also induce their flow through the latter.

The fusion furnace 174 comprises a cylindrical furnace shell 202 having a peripheral wall 204 and opposite inwardly extending end flanges 206. Fixed cover plates 208 and 210 close the adjacent open ends of the furnace shell 202. The furnace shell 202 is also provided with spaced races 212 and 214 which ride on pairs of rotary rollers 216 and 218, respectively, on a base 220 for the support of the furnace shell for rotation about its longitudinal axis which in this instance may be disposed horizontally. Suitable means, including a sprocket 222 on the furnace shell and a chain 224, may be provided to drive the furnace shell 202 at variable speed, independently of the shell 176 of the preheat furnace 172, however. A suitable burner 226 extends through the cover plate 208 into the furnace shell 202, and its flame F" is sustained by fuel and air suitably conducted to the burner.

Since a granular charge is to be fused in the furnace 174, its shell 202 is provided with a protective lining 228 which is preferably of loose unbonded granular thermal insulation and which is retained on the inner shell wall 230 by centrifugal force. To this end, the furnace shell 202 is preferably driven at a speed at which the centrifugal force of the inner lining surface 232 exceeds its gravitational force. Also, an impervious liner 234 of partly solidified and partly semi-fused matter will be permitted to form on the lining 228, either by permitting part of the latter, or the initial part of the granular charge, or both, to become fused by the heat from the flame F" and then solidified, much in the manner explained in connection with the impervious bowl 76 in the furnace of Fig. 1, except that the present liner 234 need not be concave throughout but has opposite end constrictions 235 to confine the molten charge in the liner. The granular charge, which will be introduced into the fusion furnace 174 in a manner explained hereinafter and will melt in the liner 234 therein, is in its molten state drained from this furnace by scoop-up action of the inlet end 236 of a funnel 238 which extends through the cover plate 208 to the outside of the furnace for the discharge of the molten material thereat.

The granular charge to be fused is continuously fed into the preheat furnace 172 through a chute 239 which extends through the cover plate 194 at the uppermost end of the furnace shell 176. The furnace shell 176 is driven, independently of the fusion furnace 174, at such speed that the centrifugal force of its inner peripheral wall is substantially equal to its gravitational force. In thus driving the furnace shell 176 of the preheat furnace 172 and by virtue of the explained axial inclination of the same, it is obvious that the introduced granular charge therein will repeatedly cascade transversely thereof and also progressively longitudinally thereof toward the cover plate 192. The granular charge in the preheat furnace 172 will thus cascade counter to the flow of the hot combustion products and gases from the fusion furnace which are conducted into the preheat furnace 172 through a conduit 242 between the cover plates 210 and 192. In thus cascading counter to the hot combustion products and gases in the preheat furnace 172, the granules of the charge are brought into most intimate heat-exchange relation therewith and are thoroughly preheated to near their melting point so that they will unfailingly melt on their transfer from the preheat furnace 172 into the fusion furnace 174. This transfer of the preheated granules to the charge from the preheat furnace into the fusion furnace is achieved through a chute 244 which extends between the cover plates 192 and 210 and has inlet and discharge ends 246 and 248, respectively, in the preheat and fusion furnaces of which the inlet end 246 is so disposed and of such cross-sectional area as to receive substantially all of the cascading granules of the charge as they approach the chute.

As already mentioned, the preheated granules, once transferred into the fusion furnace 174, will quickly melt therein and the melt will continuously be removed therefrom through the funnel 238. In certain cases, care must be taken that the transferred granules will not accumulate in the fusion furnace adjacent the discharge end 248 of the chute 244 where they might fail to fuse as this comparative remoteness from the hot flame F". To avoid this, recourse may be had, for instance, to an air jet or jets from a conduit 250 in the end cover 210, so directed as to scatter the preheated granules as they gravitate through the discharge end 248 of the chute 244.

The instant furnace installation 170, while involving the provision of dual furnaces and, hence, more over-all equipment than the fusion furnace of Fig. 1, has several noteworthy advantages over the latter. Thus, the fusion furnace 174 of the instant furnace installation, being driven independently of the preheat furnace 172, may be driven at such high speed as to cause the entire melt therein to adhere to and travel with the spinning liner 234 rather than form in part a puddle at the bottom of the latter, thereby assuring adequate drainage of molten material from the fusion furnace at all times regardless of the rate of delivery of preheated granular solids thereinto and permitting both furnaces to perform at optimum efficiency. Also, by thus isolating the fusion zone from the preheat zone, the intermediate semi-fused state of the granular charge is eliminated from the process, with the result that continuous operation of the furnaces may be maintained without requiring boring bars or other devices periodically to remove accumulating semi-fused masses of material between these zones.

If desired, or necessitated by heat conditions, the inner peripheral wall of the preheat furnace 176 may be provided with a lining of loose unbonded granular thermal insulation, in which case the furnace shell 176 is driven at a speed at which the centrifugal force of its inner lining surface is substantially equal to its gravitational force in order to activate the continuously fed charge therein into cascading therethrough as described.

Reference is now had to Fig. 6 which shows still another alternative furnace 260 for preheating and fusing a charge of granular solids. The furnace 260 comprises a furnace shell 262 having a peripheral wall 264 and opposite inwardly extending end flanges 266 and 268. In this case, however, the peripheral wall 264 is divided into cylindrical sections 270 and 272 of larger and smaller diameters, respectively. The furnace shell 262 is with its axis inclined to the horizontal, and is provided with spaced races 274 and 276 which ride on pairs of rotary rollers 278 and 280, respectively, on a base 282 for the support of the furnace shell for rotation about its longitudinal axis. Suitable means, including a sprocket 284 on the furnace shell and a chain 286, are provided to drive the furnace shell at variable speed.

The rear section 272 of the furnace shell 262, forming a preheat chamber 288, is peripherally lined at 290, preferably with loose unbonded granular thermal insulation of any suitable kind. The lining 290 is centrifugally sustained on the adjacent inner peripheral wall 292 of the shell section 272, and the furnace shell 262 is driven at corresponding speed.

The front section 270 of the furnace shell 262, being larger in diameter than the rear section 272 thereof and forming a fusion chamber 294, is also peripherally lined at 296, preferably with the same unbonded granular insulation as that forming the lining 290. Furthermore, an impervious concave bowl 298 of partly solidified and partly semi-fused matter is permitted to form on the lining 296 during an initial part of a fusion operation of the furnace. The bowl 298 is permitted to build up in wall thickness toward the preheat chamber 288 to such an extent that the constriction 300 at its inner end is substantially flush with the inner lining surface 302 in the rear section 272 of the furnace shell. Endwise escape of the unbonded lining 290 from the smaller into the larger section is prevented by keeping the angle of inclination of the surface of the lining with respect to the furnace axis less than the static angle of repose of the granular material. However, the bowl 298 is intermediate its ends of considerably larger inner diameter than the lining 290 in the rear section 272 of the furnace shell, and it is within this region of the bowl 298 where the fused charge will accumulate and from which it will be removed by scoop-up action of the inlet end 304 of a funnel 306 which extends through the open furnace end 308 and discharges the molten material at the outside of the furnace.

The granular charge to be fused is continuously fed into the upper or rear end 310 of the furnace through a chute 312 thereat, and the heat requisite for the preheating and fusion of the granular charge is furnished by a flame F''' from a burner 314 which extends through the open front end 308 of the furnace. The granular charge, which is continuously fed into the preheat chamber 288, is adapted to cascade therethrough toward the fusion chamber 294 for preheating purposes. To this end, the furnace shell 262 is axially inclined, as described, and the same is driven at a speed at which the centrifugal force of the inner lining surface 302 in the rear section 272 of the furnace shell is substantially equal to its gravitational force, with the result that the granular charge will repeatedly cascade not only longitudinally of the furnace toward the fusion chamber 294 but also transversely of the preheat chamber 288 for optimum heat-exchange with the combustion products and hot gases passing from the fusion chamber to and through the preheat chamber. As the preheated granular solids cascade into the impervious bowl 298 they become rapidly fused with the greater part, if not all, of the fused charge adhering to and turning with the bowl wall 318 for its continuous removal therefrom through the funnel 306 at a rate commensurate with that at which the granular charge melts continuously. Hence, while the instant furnace arrangement involves only a single furnace and, hence, less over-all equipment than the furnace installation of Fig. 5, it nevertheless is as advantageous as the latter insofar as adequate drainage of the molten charge at substantially its melting rate at optimum performance of the preheat section of the furnace is concerned. On the other hand, semi-fused matter will accumulate on the inner bowl constriction 300 in the instant furnace, and this accumulating excess semi-fused matter must, by bore bars or other devices, be periodically broken loose and dropped into the bowl 298 for fusion therein.

In each one of the various furnace installations shown and described the inner furnace lining of unbonded granular thermal insulation, except where internally lined by an impervious bowl as in Figs. 1, 5 and 6, will collapse when the furnace slows down and comes to rest. However, the collapsed lining material will on a subsequent start of the furnace form into a lining of uniform thickness as the furnace is accelerated whereupon centrifugal force will retain the lining in place in the shell. Also, in the case of each of the furnaces of Figs. 1, 5 and 6, the impervious rigid fusion bowl may be retained for successive furnace operations or may be broken off and destroyed at the end of each furnace operation and reformed at the beginning of each new furnace operation.

Underlying the present invention is the concept of applying centrifugal force in a furnace shell spinning preferably, but not necessarily, about an essentially horizontal axis in order to retain a substantial layer of unbonded granular thermal insulation on the inner peripheral wall of the furnace shell. By properly selecting the speed of rotation of the furnace, the inner lining surface therein may be located at any desired radial distance from the rotary furnace axis, thus achieving any desired thickness of the protective refractory lining. The force of gravity between the inner surface of the lining and the inner peripheral surface of the furnace shell is completely neutralized so that the loose unbonded granular lining material will form a static protective layer which rotates with the furnace shell. At lesser radial distances from the rotary furnace axis the force of gravity exceeds centrifugal force during part of each rotation so that granular material to be processed may cascade in the furnace in optimum heat-exchange relation with the combustion products and hot gases therein. By inclining the rotary axis of the furnace and driving the latter at appropriate speed, the inner lining of unbonded granular thermal insulation will cause the granular charge to be processed repeatedly to cascade in the furnace not only transversely thereof but also forwardly longitudinally thereof counter to the flow of hot combustion products and gases therein, thereby to enhance even further the heat transfer from the heating medium to the granular charge.

For fusion processes, the temperature at the discharge end of the furnace may be maintained at a sufficiently high level to fuse the adjacent inner layer of the lining material for the formation of the aforementioned fusion bowl, provided the lining material is such as to lend itself to fusion at the prevailing temperature. Due to surface tension of the molten material in the bowl, the melt will not cascade therein but will form, in part, a relatively smooth rotating layer adhering to the spinning bowl wall and, in part, a pool of liquid running along the bottom of the spinning bowl. This is true in the case of the furnace of Fig. 1, and may also be true in the case of the furnace of Fig. 6. In any event, the rotating layer of fused material on the spinning bowl wall permits the advantageous removal of the fused charge therein by scoop-up action of the inlet end of a fixed, but preferably adjustable, discharge funnel. The discharge funnel may in all cases be suitably mounted not only adjustably, but removably as well in order to permit its ready replacement when necessary.

For high-temperature thermal gas processes, the combustion zone within the furnace 110, for instance (Fig. 4), may be localized in any part of the furnace by appropriate location of the burner therein. For this process the granular lining material is preferably selected from compounds having a higher melting point than the maximum temperature used in the process. Since the lining consists of unbonded granular material, the effects of thermal stresses induced by heating and cooling will be negligible, thereby permitting the selection of a suitable lining material from a much wider range of refractory materials than that available for massive bonded refractory forms normally used for furnace constructions. By varying the relative heat transfer capacities of the cascading granules and the gases within the rotary furnace 110 in its performance pursuant to the described alternative thermal gas process, a variety of gas temperature profiles may be achieved and maintained within the furnace to promote optimum conversion efficiency for any particular gaseous product desired.

The instant rotary fusion furnaces of Figs. 1, 5 and 6 secure further significant advantages over conventional furnaces with respect to the choice of available lining materials, even admitting the use of the same material for the lining as that being processed where this is indicated to avoid contamination of the processed charge. Chemical reactivity of the lining with the process material and degradation of the lining due to thermally induced stresses are, therefore, of only minor concern in maintaining the centrifugally retained lining in the rotary fusion furnaces. Also, heat losses from the instant rotary fusion furnaces can be reduced most significantly since the unbonded granular material of the lining possesses a lower heat-transfer coefficient than the same material in massive bonded refractory form as used in conventional furnaces. Furthermore, since centrifugal force increases with the speed of rotation of these furnaces and the latter may be driven at any speed within certain limits, the protective refractory lining of unbonded granules may be of any desired thickness, and may to all practical intents and purposes be of unlimited thickness. Moreover, in instances where physical or chemical reactions do occur in the molten charge, the present rotary fusion furnaces have the added advantage that the molten material, by running along the inner surface of the spinning fusion bowl, is continuously agitated to maintain optimum uniformity of the reaction conditions throughout the molten mass.

In the final analysis, the instant rotary thermal process furnaces have the further significant advantages of being of very simple construction of exceedingly small size and accordingly low initial cost, having a very long useful life, and being easily maintained in operating condition. These highly significant advantages spring, of course, principally from the use of unbonded granular thermal insulation for the lining which is sustained by centrifugal force.

The instant rotary furnaces may be used for many thermal processes which were commercially exploited heretofore, or which could not be commercially exploited heretofore for lack of a suitable furnace lining that would withstand for any length of time the high process temperatures involved. For example, the present rotary furnaces are well adapted for the defluorination of natural phosphates by fusion in order to produce low-cost phosphatic fertilizers, or for the decomposition of calcium sulfate in its natural or artificial mineral forms to yield sulfur dioxide for the manufacture of sulfuric acid. With regard to high-temperature gas reactions in the present rotary gas processing furnace of Fig. 4, the direct fixation of nitrogen, for example, at approximately 2400° C. appears quite practical, or the same furnace may, by way of another example be used for thermally treating the various petroleum gases to produce ethylene, acetylene and the like.

Tests have shown that the instant rotary furnaces will operate in a controllable and satisfactory manner. Thus, I have provided a test furnace shell six and one-half inches in diameter and twenty inches long. This shell, which was axially slightly inclined to the horizontal with its discharge end lowermost, was rotated at 155 R. P. M. to generate a centrifugal force equal to the force of gravity at the inner surface of a lining of an inside diameter of three inches. Accordingly, the thickness of the lining was one and three-quarter inches. The lining was formed by feeding sodium chloride into the spinning shell. A burner was then introduced into the discharge end of the test furnace to heat the interior thereof near the discharge end to 800° C., this being the fusion point of the salt used. Additional salt of the same kind was then fed into the lined furnace through the other or upper end thereof. This additional salt cascaded transversely of the furnace as well as longitudinally thereof toward the discharge end thereof in the course of which it became heated to fusion and formed adjacent the discharge end a substantially horizontal open-ended impervious bowl substantially like that shown in Fig. 1. This bowl was allowed to build up, at the discharge end of the furnace, to a diameter of two and one-half inches to form a barrier for the molten mass in the bowl and prevent its escape thereat. The diameter of the fusion zone in the bowl was kept at approximately three inches. Molten salt was scooped from the upper part of the bowl within the fusion zone therein and drained from the furnace through an inclined funnel that extended to the outside of the furnace.

In another test, sodium nitrate was fused in the same furnace under operating conditions identical with those just described. Thus, the furnace shell was lined with a two inch layer of granulated sodium nitrate to serve as thermal insulation for the shell. The temperature in the discharge end of the furnace was raised to 308° C. and additional granular sodium nitrate was fed into the furnace through the opposite end thereof which initially formed an open-ended impervious bowl adjacent the discharge end to contain the subsequently fused salt. The fused salt was discharged from the bowl similarly as in the preceding test.

In each of these demonstrations or tests the wall thickness of the furnace lining was easily and positively maintained at all times throughout the length of the furnace during the fusion operation, so that there never was any danger of damaging or weakening the furnace shell or any of the furnace structure. The excess constrictions of semi-fused granules which formed at the inner end of the impervious bowl were easily dislodged by intermittent use of a manual scraping tool.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a method of thermally processing a charge of granular solids in a substantially horizontal furnace, the steps of maintaining the centrifugal force of the inner surface of a lining of unbonded granular thermal insulation on the inner peripheral wall of the furnace substantially equal to its gravitational force by spinning the furnace at corresponding speed, while confining the granular insulation against endwise escape from the spinning furnace; and introducing into the spinning furnace for thermal processing therein the charge which in the spinning furnace has a gravitational force sufficiently larger than that of the unbonded lining to be compelled by the spinning lining repeatedly to cascade transversely of the furnace.

2. The method of thermally fusing a charge of granular solids in a substantially horizontal rotary furnace, which comprises maintaining the centrifugal force of the inner surface of a lining unbonded granular thermal insulation on the inner peripheral wall of the furnace substantially equal to its gravitational force by spinning the furnace at corresponding speed, while confining the refractory granules against endwise escape from the spinning furnace; heating the interior of the spinning furnace substantially to the melting temperature of the charge to be fused; introducing into the heated interior of the lined spinning furnace the granular charge which in the spinning furnace has a gravitational force sufficiently larger than that of the unbonded lining to be compelled by the spinning lining repeatedly to cascade transversely of the furnace and then become fused; and removing the molten charge from the spinning furnace.

3. The method of thermally fusing a charge of granular solids in a rotary furnace with its rotary axis inclined to the horizontal, which comprises maintaining the centrifugal force of the inner surface of a lining of unbonded granular thermal insulation on the inner peripheral wall of the furnace substantially equal to its gravitational force by spinning the furnace at corresponding speed, while confining the granular insulation against endwise escape from the spinning furnace; heating the interior of the spinning furnace; introducing into the spinning furnace through the upper end thereof the charge which in the spinning furnace has a gravitational force sufficiently larger than that of the unbonded lining to be activated by the spinning lining repeatedly to cascade therein transversely of the furnace as well as progressively toward the lower furnace end to become gradually heated and finally fused; and removing the fused charge from the spinning furnace through the lower end thereof.

4. The method of thermally processing a continuously fed charge of granular solids in a rotary furnace with its rotary axis inclined to the horizontal, which comprises maintaining the centrifugal force of the inner surface of a lining of unbonded granular thermal insulation on the inner peripheral wall of the furnace substantially equal to its gravitational force by spinning the furnace at corresponding speed, while confining the granular insulation against endwise escape from the spinning furnace; heating the interior of the spinning furnace; continuously feeding into the spinning furnace through the upper end thereof granular solids to be processed which in the spinning furnace have a gravitational force sufficiently larger than that of the unbonded lining to be activated by the spinning lining repeatedly to cascade transversely of the furnace as well as progressively toward the lower furnace end; and removing the processed material from the spinning furnace through the lower end thereof.

5. The method of thermally fusing a continuously fed charge of granular solids in a rotary furnace with its rotary axis inclined to the horizontal, which comprises maintaining the centrifugal force of the inner surface of a lining of unbonded granular thermal insulation on the inner peripheral wall of the furnace substantially equal to its gravitational force by spinning the furnace at corresponding speed, while confining the granular insulation against endwise escape from the spinning furnace; heating the interior of the spinning furnace so that the maximum temperature therein prevails adjacent the lower furnace end and gradually decreases toward the upper furnace end; continuously feeding into the spinning furnace through the upper end thereof granular solids to be fused which in the spinning furnace have a gravitational force sufficiently larger than that of the unbonded lining to be activated by the spinning lining repeatedly to cascade transversely of the furnace as well as progressively toward the lower furnace end to become gradually heated and finally fused; and removing the fused charge from the spinning furnace through the lower end thereof.

6. The method of thermally fusing a continuously fed charge of granular solids in a rotary furnace with its rotary axis inclined to the horizontal and having in its lower end a solid open-ended concave bowl extending over an end length of the furnace, which comprises maintaining the centrifugal force of the inner surface of a lining of unbonded granular thermal insulation on the inner peripheral wall of the furnace between the bowl and the upper furnace end substantially equal to its gravitational force by spinning the furnace at corresponding speed, while confining the granular insulation against endwise escape from the spinning furnace; continuously feeding into the spinning furnace through the upper end thereof granular solids to be fused which in the spinning furnace have a gravitational force sufficiently larger than that of the unbonded lining to be activated by the spinning lining repeatedly to cascade therein transversely of the furnace as well as progressively toward the lower furnace end and to become gradually heated and finally fused in the hereinafter mentioned heat zone with the fused charge accumulating in the bowl and a layer thereof adhering to the spinning bowl wall; sustaining in the spinning furnace near the lower end thereof a flame to maintain therein a heat zone extending from the flame toward the upper furnace end; and holding an end of a channel in the path of the layer of the fused charge adhering to the bowl wall for continuous scoop-up of the former from the latter and discharge at the outside of the spinning furnace.

7. The method of thermally fusing a continuously fed charge of granular solids in a rotary furnace as set forth in claim 6, according to which a cooling agent is applied to said fused layer on the spinning bowl wall to increase the viscosity of the former so as to be carried to said channel end at a flow rate sufficient for its scoop-up at substantially the same rate at which the charge is being fused.

8. The method of thermally fusing a continuously fed charge of granular solids in a rotary furnace as set forth in claim 6, according to which compressed air is blown against said fused layer on the bowl wall in the spinning direction of the latter to increase the flow rate of the former toward said channel end for its scoop-up by the latter at substantially the same rate at which the charge is being fused.

9. The method of thermally fusing a continuously fed charge of granular solids in a rotary furnace as set forth in claim 6, according to which cool granular solids to be fused are also fed directly into said bowl to mix with the fused charge therein so as to increase the viscosity of the latter sufficiently to be carried by said bowl wall to said channel end at a flow rate for its scoop-up by the latter at substantially the same rate at which the charge is being fused.

10. The method of thermally fusing a continuously fed charge of granular solids in independently rotary preheat and fusion furnaces with the preheat furnace inclined downwardly toward and in endwise communication with the fusion furnace and the latter disposed substantially horizontally, comprising the steps of maintaining the centrifugal forces of the inner surfaces of linings of unbonded granular thermal insulation on the inner peripheral walls of the preheat and fusion furnaces substantially equal to and greater than their gravitational forces, respectively, while confining the granular insulation in each spinning furnace against endwise escape therefrom; continuously feeding into the spinning preheat furnace through the upper end thereof granular solids to be fused which in the spinning preheat furnace have a gravitational force sufficiently larger than that of the unbonded lining therein to be activated therein by the lining thereof repeatedly to cascade transversely of the furnace as well as progressively toward and through the lower end thereof into the fusion furnace; heating the interior of both furnaces with the temperature in the fusion furnace being sufficiently high to fuse the preheated granular solids passing thereinto from the preheat furnace; and constantly scooping the fused charge from the interior of the spinning fusion furnace for its discharge to the outside of the latter.

11. The method of thermally fusing a continuously fed charge of granular solids in independently rotary preheat and fusion furnaces with the preheat furnace inclined downwardly toward and in endwise communication with the fusion furnace and the latter disposed substantially horizontally, comprising the steps of maintaining the centrifugal forces of the inner surfaces of linings of unbonded granular thermal insulation on the inner peripheral walls of the preheat and fusion furnaces substantially equal to and greater than their gravitational forces, respectively, while confining the granular insulation in each spinning furnace against endwise escape therefrom; continuously feeding into the spinning preheat furnace through the upper end thereof granular solids to be fused which in the spinning preheat furnace have a gravitational force sufficiently larger than that of the unbonded lining therein to be activated by the latter repeatedly to cascade transversely of the furnace as well as progressively toward and through the lower end thereof into the fusion furnace; sustaining a flame of sufficient heat intensity in the fusion furnace to fuse a granular charge therein while maintaining a constant outward draft at the upper end of the preheat furnace to induce a flow of the combustion products and hot gases from the fusion furnace into and through the preheat furnace counter to the forward progress of the cascading granules therein for preheating the latter; and constantly scooping-up the layer of the fused charge carried by the spinning lining of the fusion furnace for its discharge to the outside of the latter.

12. The method of thermally processing a continuous gaseous charge in a rotary furnace with its rotary axis inclined to the horizontal, which comprises maintaining the centrifugal force of the inner surface of a lining of unbonded granular thermal insulation on the inner peripheral wall of the furnace substantially equal to its gravitational force by spinning the furnace at corresponding speed, while confining the granular insulation against endwise escape from the spinning furnace; sustaining in the spinning furnace intermediate its length a flame to heat the interior thereof; continuously introducing the gaseous charge into the spinning furnace through the lower end thereof and inducing its continued flow therein toward and through the upper end thereof; and continuously feeding into the spinning furnace through the upper end thereof granular solids which in the spinning furnace have a gravitational force sufficiently larger than that of the unbonded lining to be activated by the spinning lining repeatedly to cascade transversely of the furnace as well as progressively counter to the gaseous charge toward and through the lower furnace end while in heat-exchange relation with the combustion products and hot gases in the furnace and also with the gaseous charge flowing therethrough.

13. A furnace for thermally fusing a continuously fed granular charge, comprising a rigid shell having a cylindrical wall with its axis inclined to the horizontal and inwardly extending end flanges and being supported for rotation about said axis; a lining in said shell of which a first length adjacent the lower shell end is formed by a solid open-ended concave bowl and a first layer of unbonded granular thermal insulation interposed between said bowl and shell wall, and the remaining length is formed by a collapsible second layer of the same unbonded granular thermal insulation continuous with said first layer; means for driving said shell to sustain said second layer on said cylindrical wall by centrifugal force, while said end flanges confine said layers against endwise escape from said shell under any circumstances; a burner in the interior of said bowl; means for feeding the granular charge into the upper end of the lined shell; and a channel having an inlet in scooping relation with a layer of the fused charge adhering to the inner bowl wall and extending through the lower shell end to the outside thereof for the discharge of the molten charge thereat, and a conduit extending into said bowl and having a port through which to discharge a cooling air jet against the layer of the fused charge carried by the spinning bowl wall toward said channel inlet to increase the viscosity of said fused layer and, hence, its flow rate to said channel inlet.

14. A furnace for thermally fusing a continuously fed granular charge as set forth in claim 13, in which said port in said conduit is arranged to discharge therefrom a jet of compressed air generally in the spinning direction of said bowl against the layer of the fused charge carried by the spinning bowl wall toward said channel inlet.

References Cited in the file of this patent

UNITED STATES PATENTS

| | | |
|---|---|---|
| 936,981 | Brautigam | Oct. 12, 1909 |
| 1,527,729 | Dunajeff | Feb. 24, 1925 |
| 1,699,612 | Doat | Jan. 22, 1929 |
| 2,232,834 | Ahlmann | Feb. 25, 1941 |
| 2,368,270 | Story | Jan. 30, 1945 |
| 2,606,111 | Lindemuth | Aug. 5, 1952 |
| 2,663,921 | Cito | Dec. 29, 1953 |
| 2,793,018 | Trombe | May 21, 1957 |

FOREIGN PATENTS

| | | |
|---|---|---|
| 175,156 | Canada | Feb. 20, 1917 |